United States Patent

Allard et al.

[11] Patent Number: 5,991,802
[45] Date of Patent: Nov. 23, 1999

[54] METHOD AND SYSTEM FOR INVOKING METHODS OF OBJECTS OVER THE INTERNET

[75] Inventors: James E. Allard, Seattle; Vincent Fernandes; Kyle W. Geiger, both of Redmond; Seth B. Pollack, Seattle; Chad W. Royal; David S. Stutz, both of Redmond, all of Wash.

[73] Assignee: Microsoft Corporation, Redmond, Wash.

[21] Appl. No.: 08/756,380

[22] Filed: Nov. 27, 1996

[51] Int. Cl.⁶ .................................................. G06F 13/00
[52] U.S. Cl. ............................................................ 709/219
[58] Field of Search .............................. 395/200.3, 683, 395/200.33, 705, 615, 200.53, 672; 370/254; 707/104, 513; 709/200, 203, 217, 218, 219, 220, 221, 223

[56] References Cited

U.S. PATENT DOCUMENTS

| | | | |
|---|---|---|---|
| 5,608,907 | 3/1997 | Fehskens et al. | 395/672 |
| 5,706,507 | 1/1998 | Schloss | 707/104 |
| 5,726,979 | 3/1998 | Henderson et al. | 370/254 |
| 5,745,681 | 4/1998 | Levine et al. | 395/200.3 |
| 5,745,754 | 4/1998 | Lagarde et al. | 395/615 |
| 5,745,764 | 4/1998 | Leach et al. | 395/683 |
| 5,751,956 | 5/1998 | Kirsch | 395/200.33 |
| 5,761,421 | 6/1998 | Van Hoff et al. | 395/200.53 |
| 5,761,683 | 6/1998 | Logan et al. | 707/513 |
| 5,907,847 | 5/1999 | Goldberg | 707/103 |

OTHER PUBLICATIONS

Alexander Newman, Special Edition Using Java, Que, Chapter 22, Jul. 4, 1996.

Process, Dynamic Web Interfaces to Purveyor, Process Software Corporation, pp. 1–11, Jan. 1, 1996.

Mosaic for X version 2.0 Fill–Out Form Support, URL= http://www.ncsa.uiuc.e . . . ut–forms/overview.html, download date: Apr. 5, 1996.

CGI: Common Gateway Interface, URL=http://www.w3.org/pub/www/cgi, download date: Apr. 5, 1996.

The Common Gateway Interface, URL=http://hoohoo.ncsa.uiuc.edu/cgi/overview.html, download date: Apr. 5, 1996.

Common Gateway Interface, URL=http://hoohoo.ncsa.uic-u.edu/cgi/intro.html, download date: Apr. 5, 1996.

The Common Gateway Interface, URL=http://hoohoo.ncsa.uiuc.edu/cgi/primer html, download date Apr. 5, 1996.

CGI Environment Variables, URL=http://hoohoo.ncsa.uiuc.edu/cgi/env.html, download date Apr. 5, 1996.

The CGI Specification, URL=http://hoohoo./cgi/interface.html, download date Apr. 5, 1996.

The WWW Common Gateway Interface Version 1.1, URL= http://www.ast.cam.ac.uk/~drtr/cgi–spec.html, download date Apr. 5, 1996.

CGI test cases, URL=http://hoohoo.ncsa.uiuc.edu/cgi/examples.html, download date Apr. 5, 1996.

(List continued on next page.)

*Primary Examiner*—Moustafa M. Meky
*Attorney, Agent, or Firm*—Seed and Berry LLP

[57] ABSTRACT

A method and system for invoking by a client computer system of a function of an object of an object class provided by a server computer system. The client sends a request to a server that comprises a Universal Resource Locator ("URL") that identifies a script, an object class, and a function of the object class to invoke. In response to receiving the request, the server starts the script and transfers control to the script. The script instantiates an object of the object class identified in the URL of the received request and invokes the function identified in the URL of the received request. The invoked function performs the behavior of the function, creates a response to be sent to the client, and sends the response to the client. The response contains state information describing a state of the object after the behavior of the function is performed. When the client subsequently sends a request to invoke a function of the object class, the state information is included in the request so that the function can perform its behavior based on the state information.

48 Claims, 12 Drawing Sheets

OTHER PUBLICATIONS

CGI Command line options, URL=http://hoohoo.ncsa.uiuc.edu/cgi/cl.html, download date Apr. 5, 1996.

CGI Script Input, URL=http://hoohoo.ncsa.uiuc.edu/cgi/in.html, download date Apr. 5, 1996.

CGI Script Output, URL=http://hoohoo.ncsa.uiuc.edu/cgi/out.html, download date Apr. 5, 1996.

Decoding Forms with CGI, URL=http://hoohoo.ncsa.uiuc.edu/cgi/forms.html, download date Apr. 5, 1996.

Writing secure CGI scripts, URL=http://hoohoo.ncsa.uiuc.edu/cgi/security.html, download date Apr. 5, 1996.

W3C httpd CGI/1.1 Script Support, URL=http://www/w3.org/pub/ . . . User/CGI/Overview.html, download date Apr. 5, 1996.

CGI Configuration, URL=http://hoohoo.ncsa.uiu . . . ocs/tutorials/cgi.html, download date Apr. 5, 1996.

Hypertext Transfer Protocol, URL=http://www.w3.org/pub.WWW/Protocols/, download date Apr. 5, 1996.

Relevant protocols, URL=http://www.w3/org/pub/ . . . Relevant Protocols.html, download date Apr. 5, 1996.

Hypertext Transfer Protocol—HTTP/1.0, URL=http://www.w3.org/pub . . . ols/HTTP/1.0/spec.html, download date Apr. 5, 1996.

Hypertext Transfer Protocol—HTTP/1.1, URL=http://www.w3.org/pub/ . . . ols/HTTP.1.1/spec.html, download date Apr. 5, 1996.

Hypertext Transfer Protocol—Next Generation, URL=http://www.w3.org/pub/ . . . HTTP–NG/Overview.html, download date Apr. 5, 1996.

HTTP–NG Problem Statement, URL=http://www.w3.org/pub/ . . . NG/951005_Problem.html, download date Apr. 5, 1996.

Writing Internet Server Applications, Internet Server API (ISAPI) Documentation, download date Sep. 25, 1996.

Server Side Includes (SSI), URL=http://hoohoo.ncsa.uiuc.edu/docs/tutorials/includes.html, download date Oct. 8, 1996.

Object Wrapping (for) WWW)—The Key to Integrated Services, URL=http://www.ansa.co.uk/SNSA/ISF/1464/1464prt1.html, download date Apr. 8, 1996.

Comparing CORBA & WWW, URL=http://www.ansa.co.uk/ . . . ISF/1464/1464prt2.html, download date Apr. 8, 1996.

Integrating third party information services, URL=http://www.ansa.co.uk/ . . . ISF/1464/1464prt3.html, download date Apr. 8, 1996.

A stub compiler for CGI, URL=http://www.ansa.co.uk/ . . . ISF/1464/1464prt4.html, download date Apr. 8, 1996.

A Stub Compiler for HTTP, URL=http://www. ansa.co.uk/ . . . ISF/1464/1464prt5.html, download date Apr. 1996.

An application scenario, URL=http://www.ansa.co.uk/ . . . ISF/1464/1464prt6.html, download date Apr. 8, 1996.

Conclusions, URL=http://www.ansa.co.uk/ . . . ISF/1464/1464prt7.html, download date Apr. 8, 1996.

Acknowledgements, URL=http://www.ansa.co.uk/ . . . ISF/1464/1464prt 8.html, download date Apr. 8, 1996.

References, URL=http://www.ansa.co.uk/ . . . ISF/1464/1464prt9.html, download date Apr. 8, 1996.

Proxies, URL=http://www.w3.org/pub/user/Proxies/Proxies.html, download date Apr. 8, 1996.

Configuring Proxy To Connect To Another Proxy, URL=http://www.w3.org/pub/ . . . oxies/Many Proxies.html, download date Apr. 8, 1996.

Proxy Caching, URL=http://www.w3.org/pub/ . . . er/Config/Caching.html, download date Apr. 8, 1996.

Setting Up Clients To Use a Proxy, URL=http://www.w3.org/pub/ . . . xies/ProxyClients.html, download date Apr. 8, 1996.

HTTP Request —1001
    GET: http://www.acme.com/shim.dll/bookorder.exe/order?param1=book1 —1001a
    USER-AGENT: IE3 —1001b
    FROM: GradeSchool1 —1001c Template —1002
    ADD_DEFAULT: Authorization: PUBLIC —1002a
    FILTER: From = GradeSchool; ADD %func_checkbooks% —1002b
    DELETE: Server —1002c Shadow HTTP Request —1003
    GET: http:www.acme.com/shim.dll/bookorder.exe/order?param1=book1 —1003a
    AUTHORIZATION: PUBLIC —1003b
    USER_AGENT: IE3 —1003c
    FROM: GradeSchool1 —1003d
    %func_checkbooks% —1003e Final HTTP Request —1004
    GET: http://www.acme.com/restricted_msg —1004a
    AUTHORIZATION: PUBLIC —1004b
    USER_AGENT: IE3 —1004c
    FROM: GradeSchool1 —1004d

*Fig. 10*

METHOD AND SYSTEM FOR INVOKING METHODS OF OBJECTS OVER THE INTERNET

TECHNICAL FIELD

The present invention relates generally to a computer method and system for invoking methods, and more specifically, to a method and system of invoking methods of a server object over the Internet.

BACKGROUND OF THE INVENTION

The Internet comprises a vast number of computers interconnected so that information can be exchanged among the computers. Various protocol and other interface standards have been developed for the Internet so that each computer will understand information of the other computers. The World-Wide Web ("WWW") is a subset of the Internet computers that support the Hypertext Transfer Protocol ("HTTP"). HTTP is an application-level protocol for distributed, collaborative, hyper-media information systems that defines the format and contents of messages and responses sent between client programs ("clients") and server programs ("servers") over the Internet. In addition, HTTP is a generic, stateless, object-oriented protocol which can be used for many other tasks, such as name servers and distributed object management systems, through various extensions.

The Internet facilitates information exchange between servers and clients that are located throughout the world. Each computer on the Internet has a unique address (e.g., "acme.com"). When a client wishes to access a resource (e.g., document), the client specifies a Uniform Resource Locator ("URL") that uniquely identifies the computer on which the server executes and the resource. An example of a URL is "http://acme.com/page1." In this example the server is identified by "acme.com" and the resource is identified by "page1." The URL has two parts: a scheme and a scheme-specific part. The scheme identifies the high-level protocol through which the information is to be exchanged, and the scheme-specific part contains additional information that identifies the server computer and the resource. The "http" at the beginning of the example URL is the scheme and indicates that the remainder of the URL should be interpreted according to HTTP. The remainder specifies a server computer (e.g., "acme.com") followed by additional information that is specific to the server. For example, the additional information may be a path name within the server computer to a Hypertext Markup Language ("HTML") document.

HTTP is based on a request/response paradigm. An HTTP message consists of a request from a client sent to a server and a response sent from the server to the client. A client sends a request to the server in the form of a request line comprising a method (e.g., "GET") and a URL, optionally followed by a request header that allows the client to pass additional information about the request, a general header that allows a client to specify optional behavior that can be performed by the server, and an entity header and entity body that allow the client to send arbitrary information that is understood by a server. The server responds with a status line indicating status of the request (e.g., success or fail) followed by a response header that allows the server to send additional information to a client, and a general header, entity header, and entity body that is analogous to those sent in the request. The request line of an HTTP request begins with a method token followed by a request URL. HTTP defines three request line methods that include "get," "head," and "post." HTTP further defines extension methods. The status line of an HTTP response includes a status code and a user readable reason phrase that indicates the status of the request. The headers generally contain a list of fields that include a field name, a colon, and a field value.

HTTP has been extended to permit a client to specify that a computer program is to be executed by the server. Two such extensions are the Common Gateway Interface ("CGI") and the Internet Server Application Programming Interface ("ISAPI"). CGI defines a sub-protocol of HTTP for running external softwares or gateways under a server in a platform-independent manner. A URL in an HTTP request specifies not only the protocol and server computer, but also a script, a behavior of the script, and parameters to pass to the script. When a server using CGI receives a URL, it recognizes that the client is requesting that a script be invoked. The server parses the information from the HTTP request and stores the information in "environment variables." For example, an environment variable named "scriptlname" contains the name of the script to be executed, and the environment variable named "content_length" contains the length of the entity body attached to the request. The server also invokes the specified script. The executing script can then request the various environment variables to be supplied by the server. Although the CGI and ISAPI protocols specify the format and semantics of executing a computer program at servers, they do not specify how to implement such server or scripts.

Because a client can specify a program to execute, there is a possibility that a client may request execution of a program for which it is not authorized or that may cause serious problems on the server computer. For example, if a client sends to a server a file that contained a program to erase a disk drive and requests that it be stored on the server computer. The client might then request that the client execute that file, which would result in erasure of the disk drive. Although servers could be developed to ensure that no such programs can be executed, currently typical servers do not provide such assurances. It would be desirable to have a mechanism that would allow existing servers to provide such assurances.

SUMMARY OF THE INVENTION

The present invention provides a method and system for invocation by a client program of a function of an object of an object class through a server program executing on a server computer system. The server program receives a request sent from the client program that identifies a shim script, an object class, and a function of the object class. In response to receiving the request, the server program loads and transfers control to the identified shim script. When an object of the identified object class does not exist, the shim script instantiating an object of the identified object class. The shim script then invokes the identified function of the instantiated object. The invoked function performs its behavior, creates a response to be sent to the client program, and sends the response to the client program. The response contains state information describing a state of the object after the behavior of the function is performed. The client program can send this state information when invoking another function of the object. The object can then be initialized to this state information to allow continued processing where it left off. In one embodiment, the server program and the shim script supports an Internet Server Application Programming Interface ("ISAPI") protocol. To avoid excessive overhead of instantiating objects, the shim script maintains a reference to the object so that upon receiving a subsequent request from a client program to invoke a function of an object of the identified object class, the referenced instance of the object can be used without instantiating a new object of the identified object class.

In another aspect, the present invention provides a method and system for modifying messages being transferred between a client program and a server program. The system defines a template having command lines that specify a command to perform on a message. The system performs the command of each command line of the template on the message to generate a shadow message. For each line in the shadow message, the system then determines whether the line contains a parameter and performs a behavior associated with the parameter. The parameters can be either a substitute parameter or a function parameter.

When the parameter is a substitute parameter, the system replaces the parameter with a value. When the parameter is a function, the system invokes a function associated with the parameter to modify the message. The message can either be a Hypertext Transfer Protocol ("HTTP") request or an HTTP response. After the parameters are processed, the resulting message is processed by an HTTP client or server.

BRIEF DESCRIPTION OF THE DRAWINGS

FIG. 10 illustrates an HTTP request, an HTTP template, a resulting shadow HTTP request, and a resulting final HTTP request.

DETAILED DESCRIPTION OF THE INVENTION

The present invention provides a method and system that extends an Internet protocol to allow methods of object classes to be invoked via Internet servers. In one embodiment, a shim script manages the invoking of the methods of object classes in response to receiving requests from clients (e.g., browsers). A server, upon receiving from a client a request that identifies the shim script, loads and executes the shim script passing information describing the received request. The shim script retrieves from the request an indication of an object class and a method of the object class to invoke. The shim script instantiates an object of the indicated object class and invokes the indicated method. The invoked method performs its behavior and sends a response to the client. The response contains information describing the state of the instantiated object after the method performs its behavior. The client can then send to the server a second request to invoke a method of the object class. The second request includes the state information that was received in the response. When the server receives the request, it handles the request in the same manner as the original request. That is, the shim script is executed, the object is instantiated, and the method is invoked. However, the invoked method performs its behavior based on the state information that was sent in the request. In this way, a client can invoke methods of objects that appear to maintain their state in-between the sending of requests from the client to the server. Thus, even though the model of an Internet communications protocol specifies a stateless protocol, that is a server does not maintain state relating to a request after a response is sent, the maintaining of state is simulated for objects of arbitrary object classes.

Figure 1:
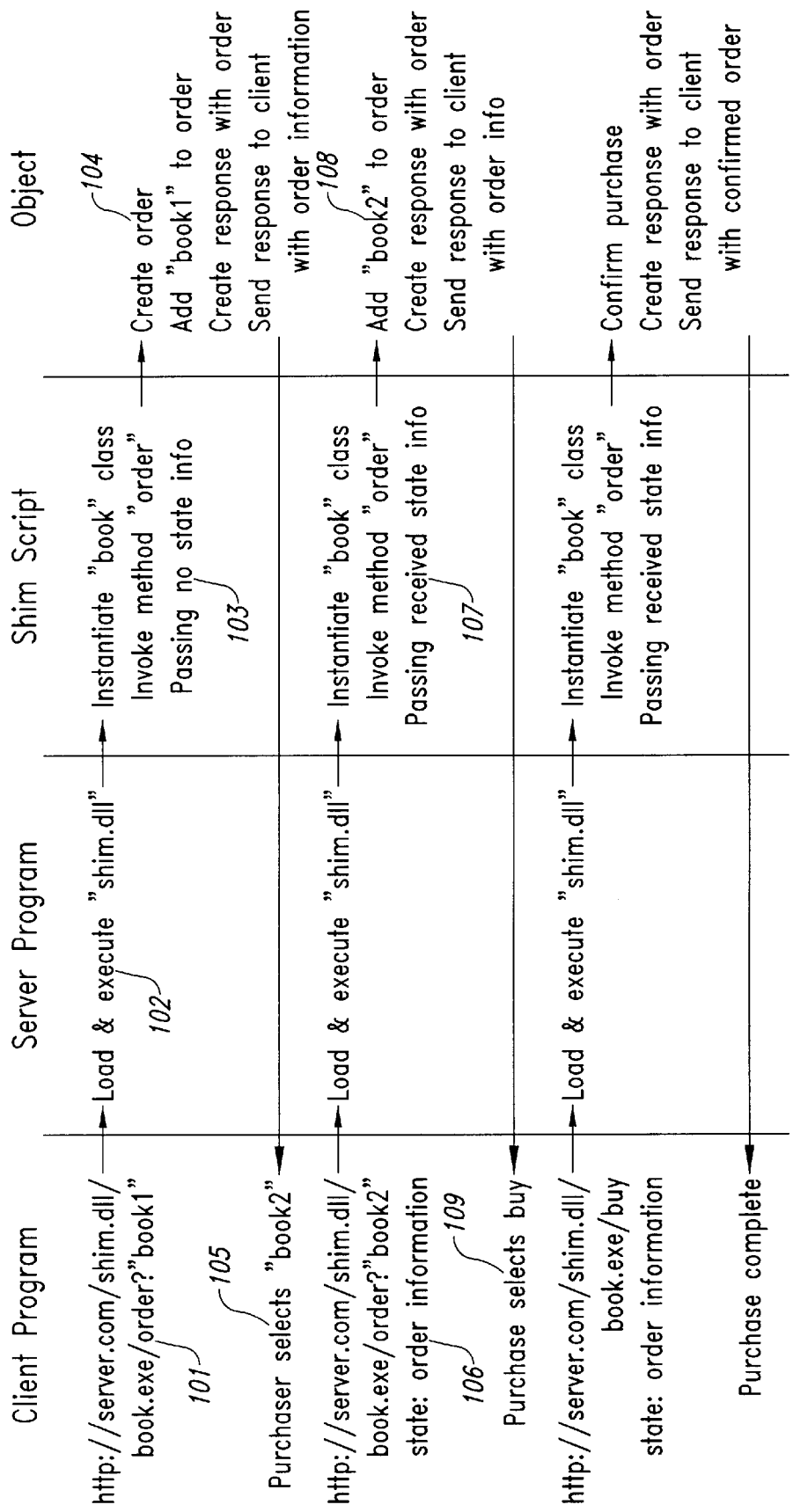
FIG. 1 illustrates an example of simulating the maintaining of state by a server.

FIG. 1 illustrates an example of simulating the maintaining of state by a server. In this example, the server computer provides a computer program that allows a user to order books. To allow the ordering of books electronically via the Internet, the computer program exposes certain of its objects via OLE Automation. (OLE Automation is described in detail in Inside OLE2, Kraig Brockschmidt, Microsoft Press, 1994.) For example, the computer program may expose an order object class that allows for the electronic ordering of books. An HTML document would be defined that would, when displayed, allow a purchaser to select a book to add to their order. When the purchaser indicates that a certain book is to be added to the order, a request with a URL 101 that encodes the shim script (e.g., "shim.dll"), the order object class (e.g., "book.exe"), the method to add a book to an order (e.g., "order"), and the identification of the book (e.g., "book1") is sent to the server. The server loads and executes 102 the shim script. The shim script, which is developed to invoke objects exposed via OLE Automation, instantiates an object of the order object class and invokes the method to add a book to an order passing the request received from the client 103. The method creates 104 an order for the purchaser and adds the book to the order. The method then stores information describing the order into a response and sends the response to the client. When the client receives the response, the purchaser then selects 105 another book to purchase. In response, a second request 106 is sent to the server program, but this time the request includes the current state of the order. When the method is eventually invoked 107, it uses the received state information to determine that an order has already been created and adds 108 the second book to the order. Eventually, the purchaser would select 109 to actually purchase the order. In response, the browser would send a request to the server with the purchase method of the order object class encoded into the URL.

In another aspect, the present invention pre-processes HTTP requests and post-processes HTTP responses. This processing allows for modification of a request before it is processed by a server and of a response after it is generated by the server. By modifying an HTTP request, an HTTP request, which was originally received in a format that is not in conformance with the server, can be modified to be in conformance. Similarly, an HTTP response that is not in a format, which is in conformance with the requesting client, can be modified to be in conformance. In one embodiment, a template is defined which specifies the modifications to be made to a response or request. The modification can be conditional. For example, the template may indicate that a certain field should be added if not already present in the HTTP request. Thus, the field is added only if not already present. The templates can be applied either at the client computer or at the server computer.

Figure 2:
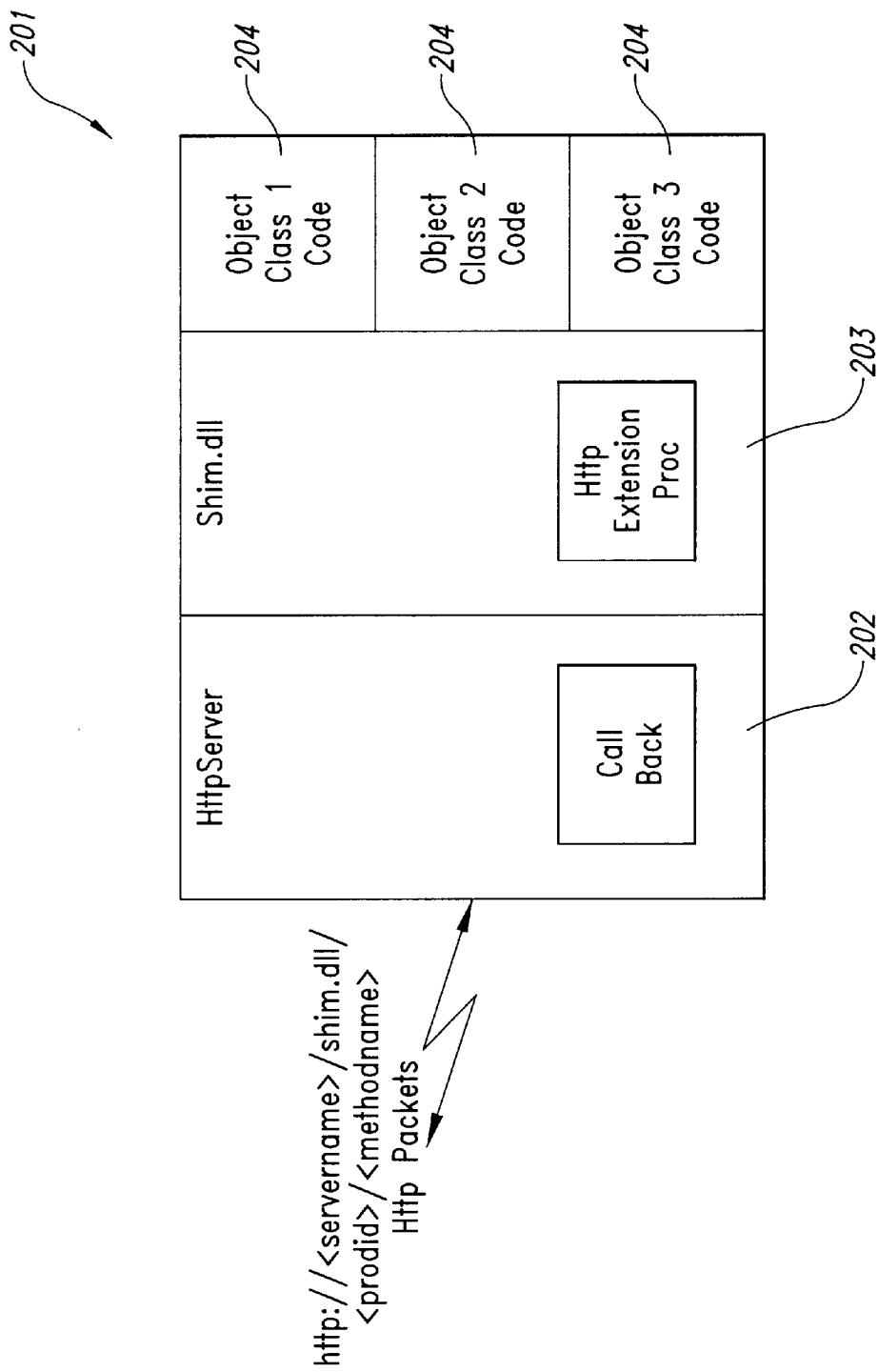
FIG. 2 is a block diagram illustrating a server computer system.

FIG. 2 is a block diagram illustrating a server computer system. The server computer system 201 comprises an HTTP server 202, Shim dynamic link library (DLL) 203, and implementations of various object classes 204. When the HTTP server receives an HTTP request, it parses the request to determine whether it is a request to load a dynamic link library. For example, if the script is identified with the suffix "DLL," then the HTTP server assumes that the HTTP client is requesting to load a dynamic link library. The HTTP server then locates the dynamic link library of the specified name (e.g., "shim.dll") and loads it into memory. The dynamic link library contains a procedure named "HTTPExtensionProc," which is used to pass information relating to the HTTP request to the dynamic link library. The HTTP server also provides a callback routine so that the dynamic link library can retrieve or set various environment variables. When the procedure HTTPExtensionProc of the Shim is invoked, the procedure determines from the URL the object class of the object to be instantiated. If the object of that object class is not already instantiated, then the Shim instantiates an object of that object class. In one embodiment, the Shim maintains a reference to the objects that it instantiates even after a response is sent to the client that on whose behalf the object was instantiated. When another request is received, irrespective of whether the request was sent from the same or different client, to invoke a method of an object class corresponding to a referenced object, then the Shim can simply invoke the method of the referenced object. In this way, the Shim avoids the overhead of instantiating and destroying an object for each request. This overhead may be excessive when the object is instantiated in a separate process from the server process. Rather, the Shim can effectively re-use the instantiated objects. The Shim then invokes the method of the instantiated object indicated by the URL. When the method completes its processing, it formats and sends an HTTP response to the HTTP client. The HTTP response includes the current state of the object so that a subsequent request from the client program can include the current state. The method then returns to the Shim, which returns to the HTTP server. Shim programs can eventually destroy the instantiated objects to make space available for other objects or when a certain object has not been accessed for a certain time period.

Figure 3:
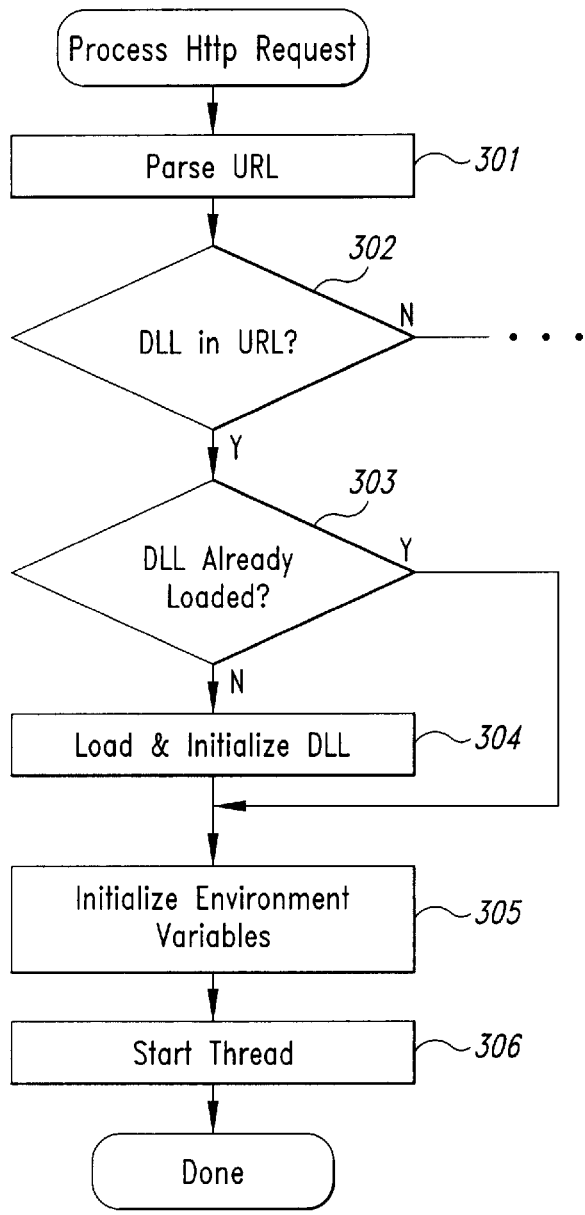
FIG. 3 is a flow diagram illustrating the processing of an HTTP request that is received by the HTTP server.

FIG. 3 is a flow diagram illustrating the processing of an HTTP request that is received by the HTTP server. The HTTP server processes requests that specify a dynamic link library in the URL by loading the dynamic linked library and invoking a function of the loaded library. In step 301, the HTTP server parses the URL of the received request. In step 302, if a dynamic link library is designated to be loaded and executed, then the server continues at step 303, else the HTTP server continues with its normal processing. In step 303, if a dynamic link library of the specified name is already loaded, then the HTTP server continues at step 305, else the HTTP server continues at step 304. In step 304, the HTTP server loads and initializes the designated dynamic link library. In step 305, the HTTP server initializes the environment variables. These environment variables include server properties such as authorization type and content length, input headers from the HTTP request, and identification of the client. These variables are passed to the dynamic link library via callback routine. In step 306, the HTTP server starts a thread to process the HTTP request and then completes. The HTTP server allocates a thread for processing each HTTP request that specifies a dynamic link library. Rather than creating and destroying a new thread whenever such an HTTP request is received, the HTTP server maintains a pool of threads that it can simply allocate and de-allocate for processing each HTTP request.

Figure 4:
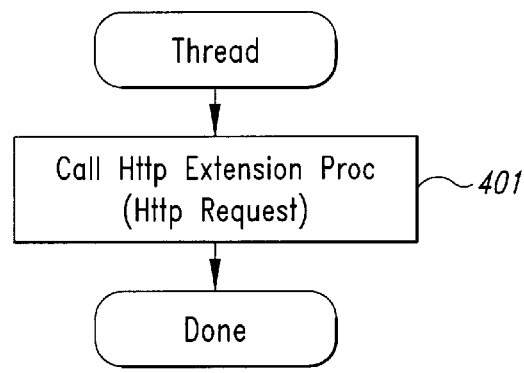
FIG. 4 is a flow diagram of the thread to process an HTTP request.

FIG. 4 is a flow diagram of the thread to process an HTTP request. Once the thread is started, the thread invokes the procedure HTTPExtensionProc passing the HTTP request.

Figure 5:
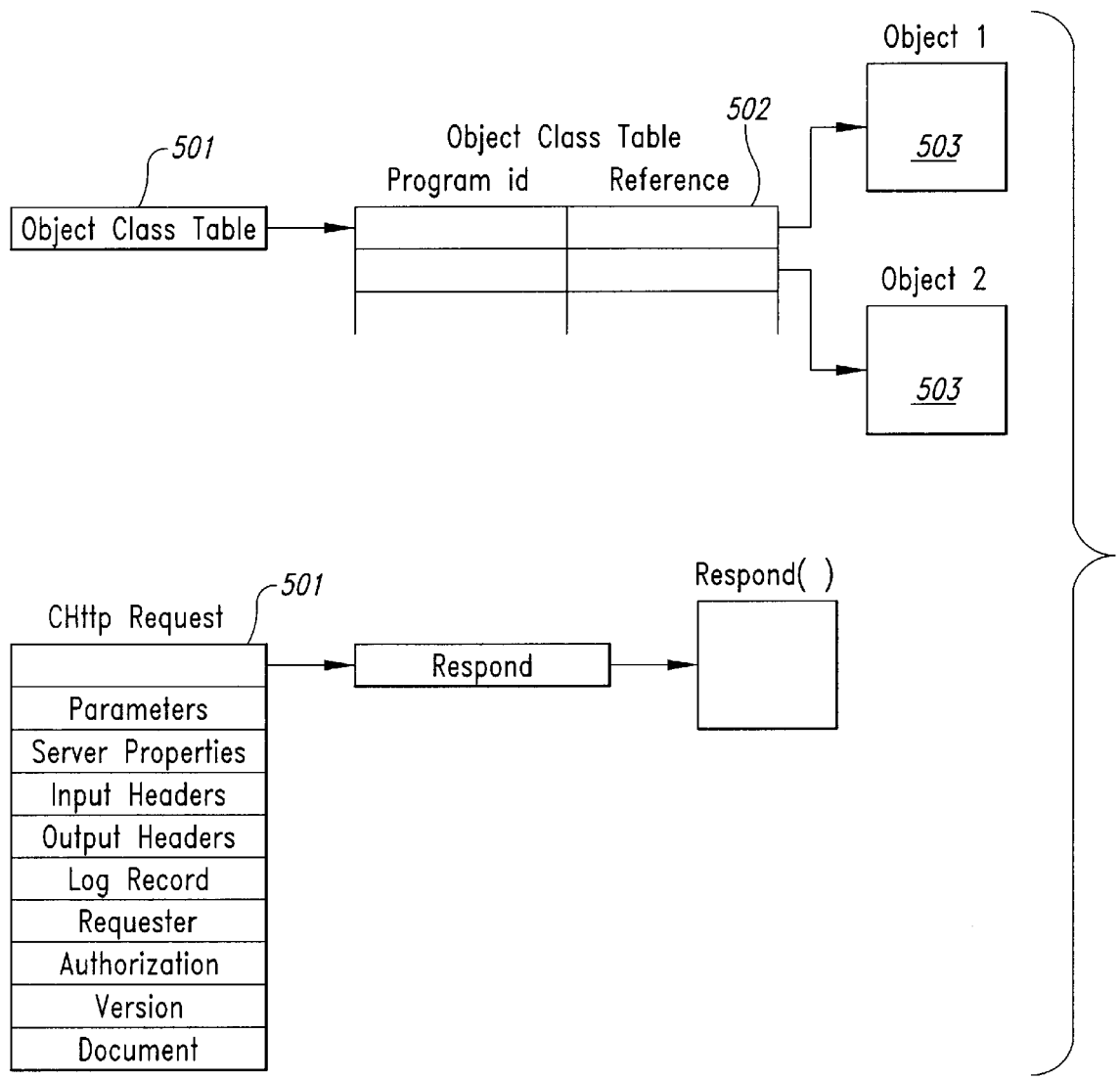
FIG. 5 shows various data structures used by the Shim.

FIG. 5 shows various data structures used by the Shim. Each thread maintains a local reference 501 to an object class table 502 that contains references to objects 503 instantiated by the Shim. The object class table maps the program identifier received in the URLs to references to objects. Whenever a method of a certain object class is to be invoked, the Shim scans the object class table to determine whether it contains a reference to an object of that object class. When the Shim does invoke the method, the Shim passes an object 504 of class CHttpRequest as a parameter. The CHttpRequest object has data members that describe the request and has a method Respond for sending a response to the client. The Shim sets the data members of the CHttpRequest object based on the environment variables retrieved from the server and based in the request itself. The CHttpRequest object has the following data members: parameters, server properties, input header, output header, log record, requester, authorization, version, and document.

Figure 6:
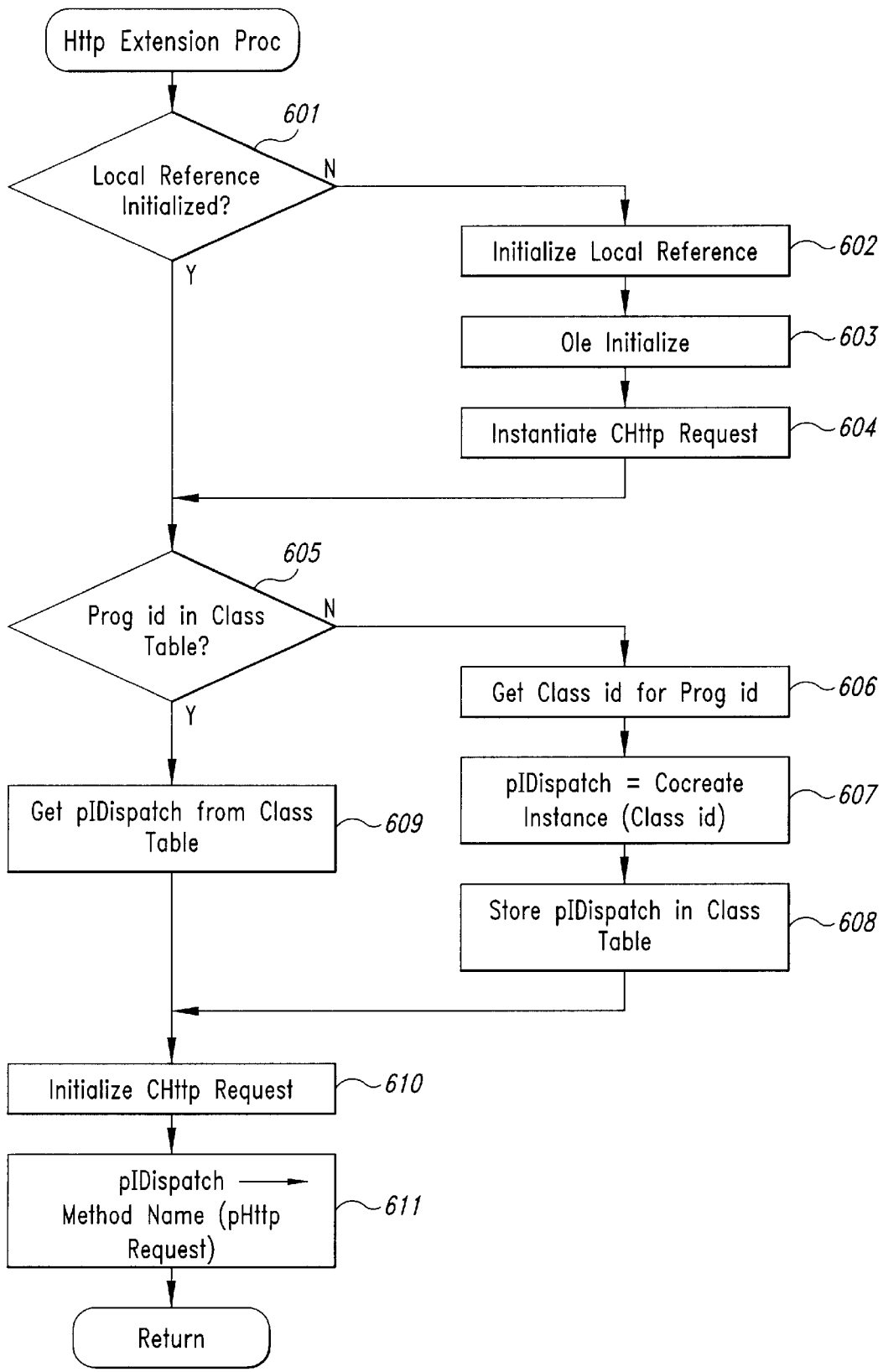
FIG. 6 is a flow diagram of an embodiment of the procedure HTTPExtensionProc that is provided by the Shim.

FIG. 6 is a flow diagram of an embodiment of the procedure HTTPExtensionProc that is provided by the Shim. This procedure initializes the CHttp request object, instantiates an object of the requested object class (if not already instantiated), and invokes the request method of the instantiated object. In step 601, the procedure determines whether the local reference to the object class table has been initialized. If so, the thread has already been initialized and the procedure continues at step 605, else the procedure continues at step 602. In step 602, the procedure initializes the local reference to point to the object class table. In step 603, the procedure invokes the function OLEInitialize to register the thread with OLE. The function OLEInitialize is a standard function provided as part of OLE Automation. In step 604, the procedure instantiates an object of the CHttpRequest class. In step 605, if the program identifier in the URL is already in the object class table, then the procedure continues at step 609, else the procedure continues at step 606. In step 606, the procedure gets the class identifier for the program identifier from the central registry. The central registry contains a mapping from program identifiers to the object class exposed by that program. In step 607, the procedure invokes the function CoCreateInstance to create an instance of the identified class and receives a pointer to the IDispatch interface of that instance. The function CoCreateInstance is a function provided as part of OLE Automation. The IDispatch interface allows for the invocation of methods that are bound to at run time. In step 608, the procedure stores the pointer to the IDispatch interface in the object class table. In step 609, the procedure retrieves the pointer to the IDispatch interface from the object class table. In step 610, the procedure initializes the CHttpRequest object with information retrieved by invoking the callback of the HTTP server and by processing the HTTP request. In step 611, the procedure invokes the method of the URL using the IDispatch interface passing the CHttpRequest object and then returns.

Figure 7:
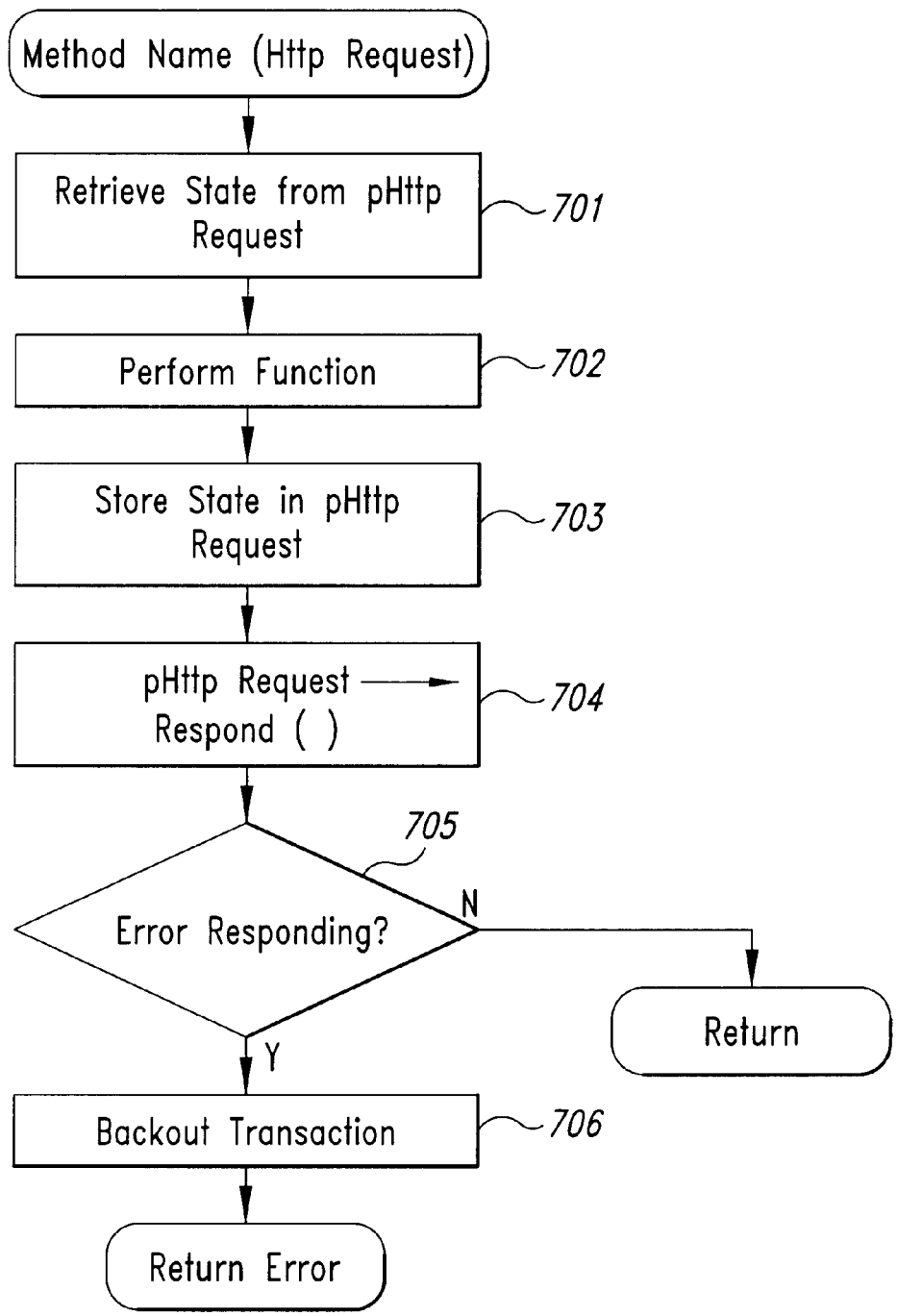
FIG. 7 is a flow diagram of an embodiment of a sample method of an object.

FIG. 7 is a flow diagram of an embodiment of a sample method of an object. The sample method is passed the HttpRequest object. In step 701, the method retrieves the initial state for the object from the CHttpRequest object. The initial state is stored in the input header data member. In step 702, the method performs the behavior of the method (e.g., checking book inventory and adding a book to an order). In step 703, the method stores the current state in the CHttpRequest object in the output header data member. In step 704, the method invokes the method Respond of the CHttpRequest object to create and send a response to the requesting client. In step 705, if there was an error in responding to the client, then the method continues at step 706, else the method returns. In step 706, the method backs out of any processing performed (e.g., decrementing inventory) since it was invoked and returns an error. The method would also update the log record data member to log the invocation.

Figure 8:
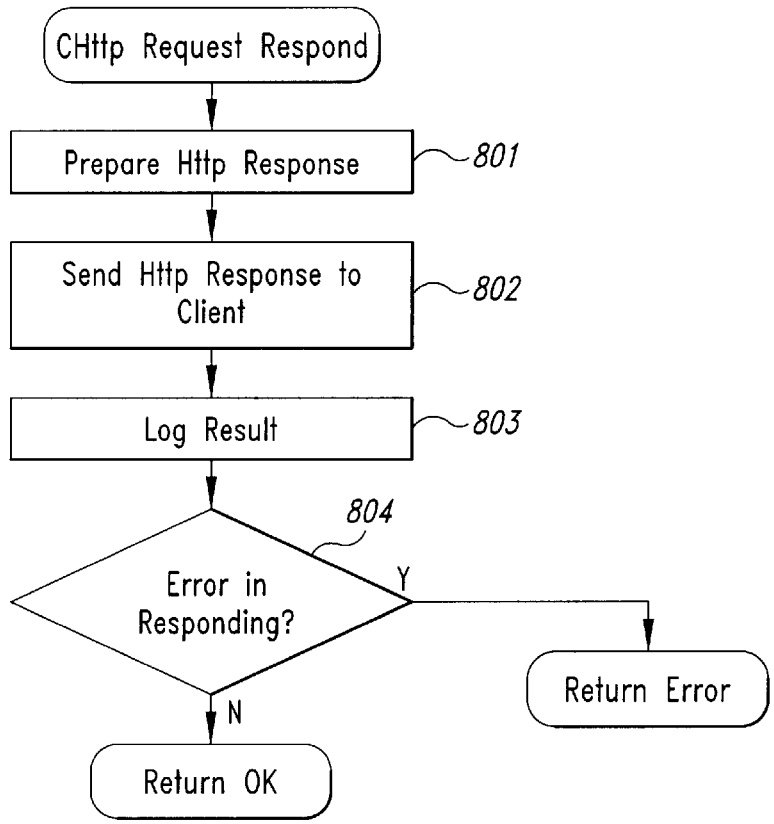
FIG. 8 is a flow diagram of the Respond method of the CHttpRequest class.

FIG. 8 is a flow diagram of the Respond method of the CHttpRequest class. This method prepares an HTTP response based on the data in the CHttpRequest object and sends the HTTP response to the client. In step 801, the method prepares an HTTP response based on the information in the CHttpRequest object. In step 802, the method sends the HTTP request to the requesting client. In step 804, the method invokes a callback of the HTTP server to log the status of the response and any logs in the log record data member of the HttpRequest object. In step 804, if there was an error in responding, then the method returns an error, else the method returns an indication of success.

Figure 9:
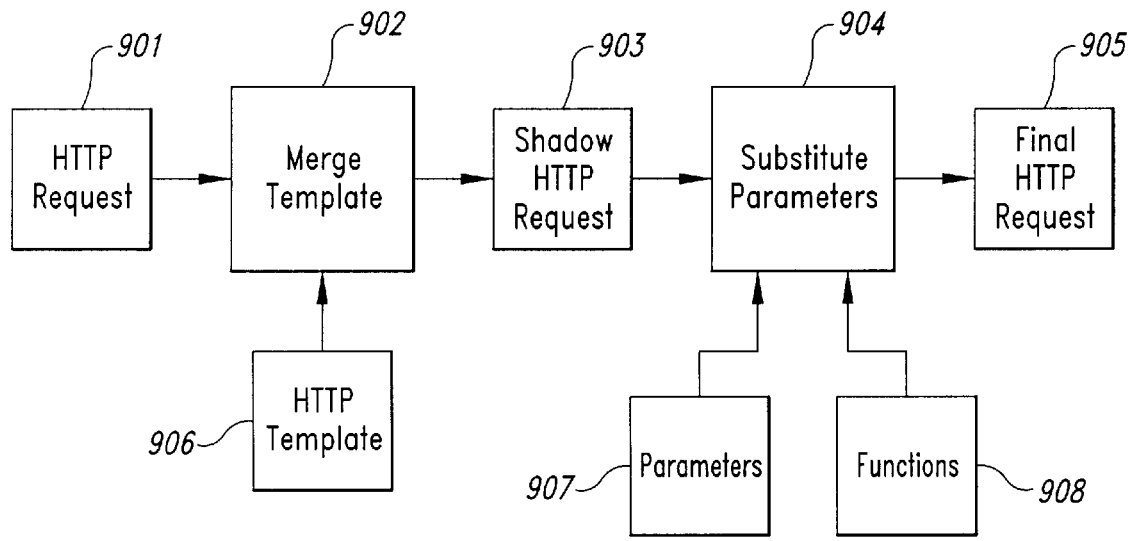
FIG. 9 is a block diagram illustrating template processing.

FIG. 9 is a block diagram illustrating template processing. The merged template component 902 receives an HTTP request 901 and an HTTP template 906 and merges the HTTP template with the HTTP request to produce the shadow HTTP request 903. The substitute parameters component 904 inputs the shadow HTTP request and substitutes any parameters in the request based on the parameters table 907 or invokes a function 908 as specified by a function parameter. The substitute parameter component generates the final HTTP request 905 which is then input to the server. Although not explicitly illustrated, analogous components can be used to apply HTTP templates to HTTP responses.

FIG. 10 illustrates an HTTP request, an HTTP template, a resulting shadow HTTP request, and a resulting final HTTP request. The HTTP request 1001 contains the request line 1001a, a User-Agent field 1001b, and a From field 1001c. The template 1002 contains an Add_Default command 1002a, a Filter command 1002b, and a Delete command 1002c. The Add_Default command indicates that if an Authorization field is not present in the HTTP request, then an authorization field should be added with its value equal to "public." The Filter command indicates that if the HTTP request is sent from a grade school, then the parameter %func.checkbooks% should be added to the HTTP request. The parameters are delimited by percent symbols ("%"). A parameter with the prefix "func" indicates that a function is to be invoked to process the HTTP request. The Delete command indicates that if a Server field is in the HTTP request, then it should be deleted. The shadow HTTP request 1003 indicates the result of merging the template with the HTTP request. The Authorization field 1003b has been added to the shadow HTTP request, and the parameter 1003e was added to the HTTP request. To generate the final HTTP request 1004, the system processes the parameters of the shadow HTTP request 1003. In this example, the only parameter is the parameter "func.checkbooks." The substitute parameters component detects that the parameter "func.checkbooks" is a call to a function named "checkbooks." The substitute parameters component invokes the function "checkbooks" passing the shadow HTTP request. That function determines that a grade school is not authorized to order "book1." Therefore, the function replaced the request line with a request to retrieve a restricted message. Thus, the purchaser would view the restricted message rather than a confirmation of the order.

Figure 11:
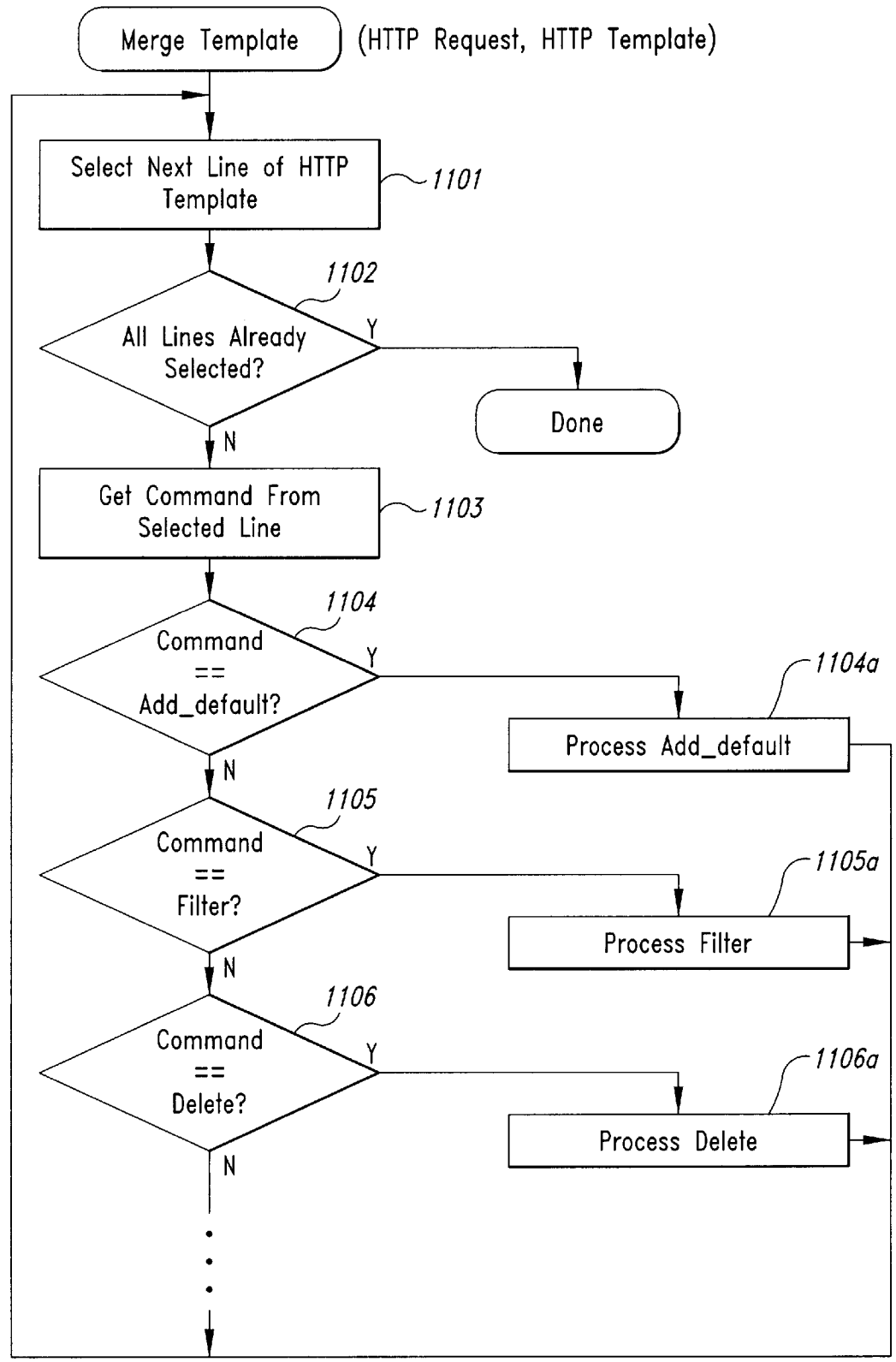
FIG. 11 is a flow diagram of an implementation of the merge template component.

FIG. 11 is a flow diagram of an implementation of the merge template component. The merge template component inputs the HTTP request and the HTTP template and outputs the shadow HTTP request. The merge template component processes each line of the HTTP template and applies the command to the HTTF request. In step 1101, the component selects the next line of the HTTP template. In step 1102, if all the lines of the HTTP template have already been selected, then the component is done, else the component continues at step 1103. In step 1103, the component retrieves the command (e.g., "Add_Default") from the selected line HTTP template. In step 1104, if the command is the add default command, then the component continues at step 1104a to process the add default command, else the component continues to step 1105. In step 1105, if the command is the filter command, then the component continues at step 1105a to process the filter command, else the component continues at step 1106. In step 1106, if the command is the delete command, then the component continues at step 1106a to process the delete command, else the component continues processing the various commands of an HTTP template file. The component then loops to step 1106 to select the next line of the HTTP template.

Figure 12:
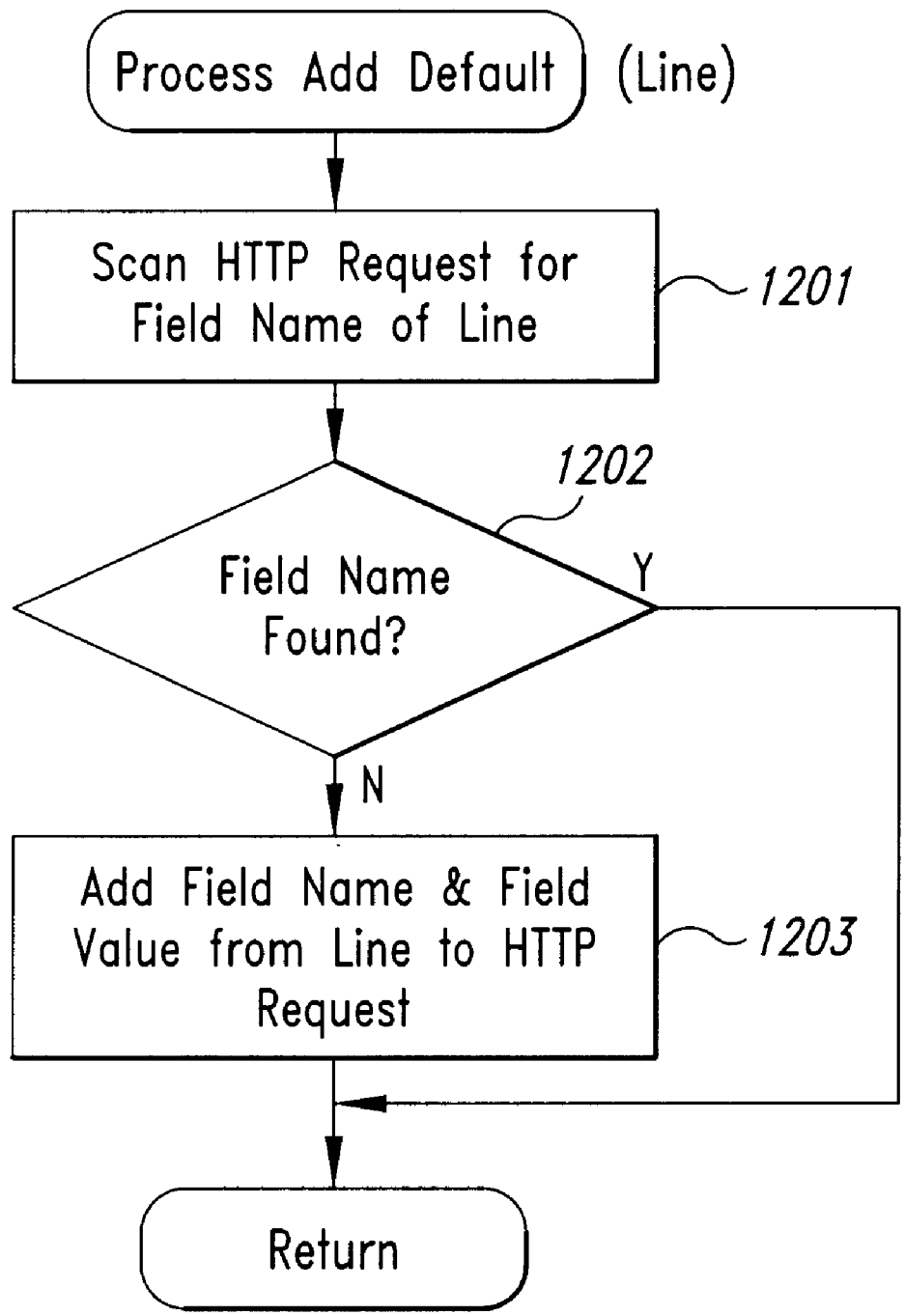
FIG. 12 is a flow diagram of an implementation of the processing of an add default command.

FIG. 12 is a flow diagram of an implementation of the processing of an add default command. This processing determines whether the HTTP request includes a line with a field name designated on the add default line. If the HTTP request does not include such a field name, then the processing adds the field name and the field value. In step 1201, the processing scans the HTTP request for the field name that is designated in the command line. In step 1202, if no such field name is found in the HTTP request, then the processing completes, else the processing continues at step 1203. In step 1203, the processing adds the field name and field value from the command line to the HTTP request and returns.

Figure 13:
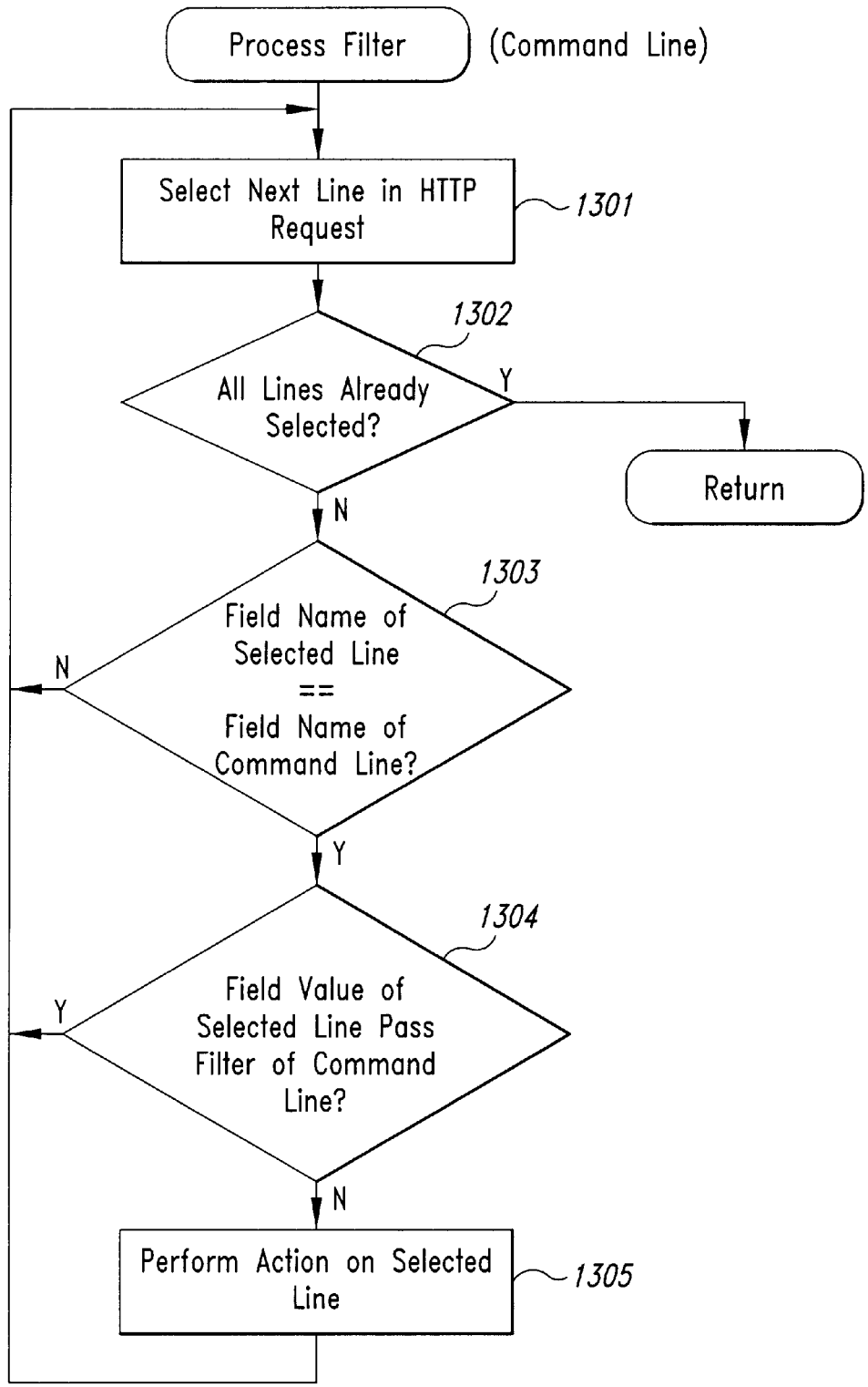
FIG. 13 is a flow diagram of an implementation of the processing of a filter command.

FIG. 13 is a flow diagram of an implementation of the processing of a filter command line. The processing determines if there is a field with the specified name and if so, determines if it passed the filter. If it does not pass the filter, then an action specified by the command line is performed. In step 1301, the processing selects the next line of the HTTP request. In step 1302, if all the lines have already been selected, then the processing completes, else the processing continues at step 1303. In step 1303, if the field name of the selected line is equal to the field name of the filter command line, then the processing continues at step 1304, else the processing loops to step 1301 to select the next line in the HTTP request. In step 1304, if the field value of the selected line passes the filter of the command line, then the processing loops to step 1301 to select the next line in the HTTP request, else the processing continues at step 1305. In step 1305, the processing performs the action of the command line on the HTTP request. For example, as shown in 1002b, the action indicates that a function invocation parameter should be added to the HTTP request. The processing then loops to step 1301 to select the next line in the HTTP request.

Figure 14:
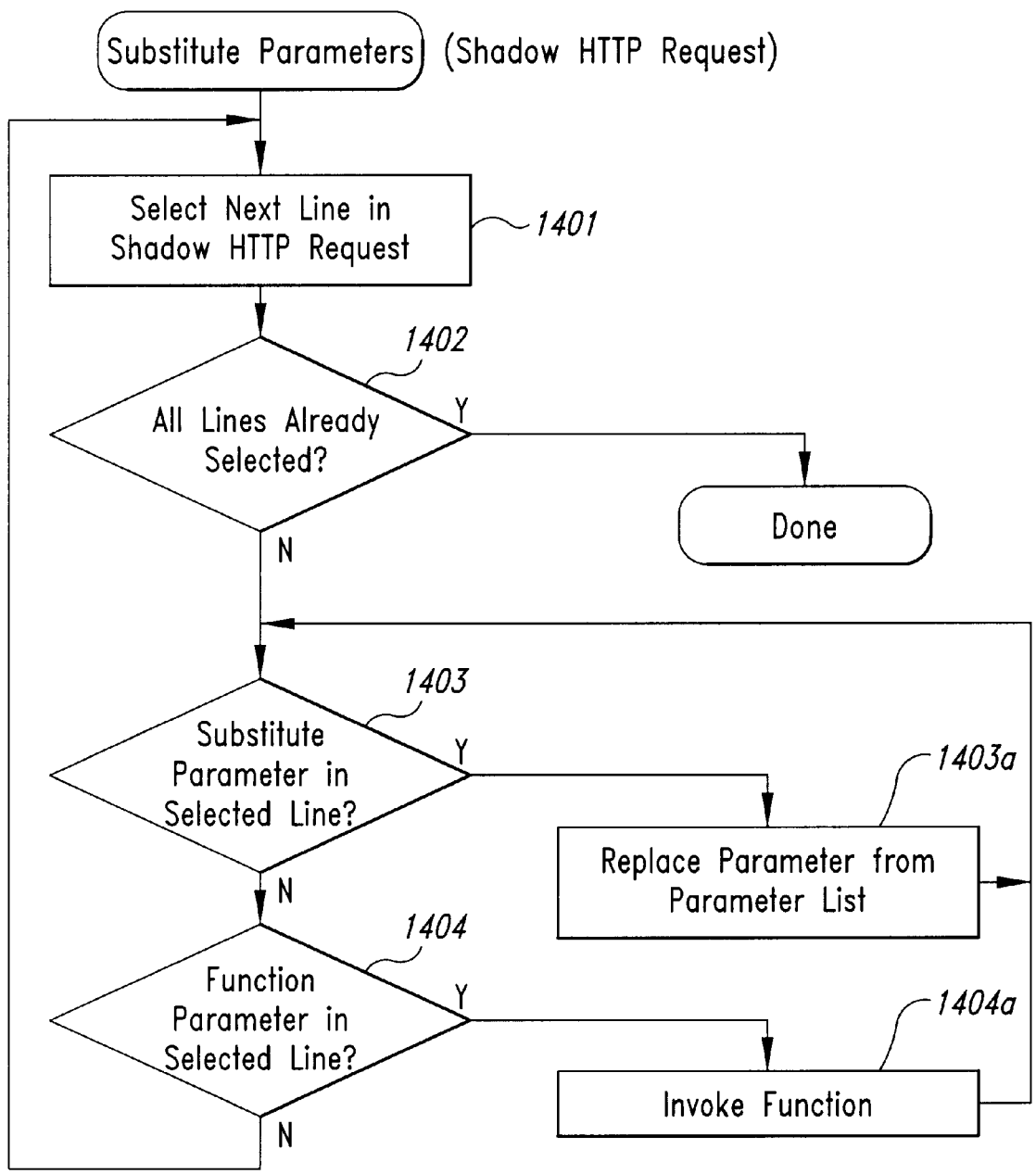
FIG. 14 is a flow diagram of an implementation of the substitute parameters component.

FIG. 14 is a flow diagram of an implementation of the substitute parameters component. The substitute parameters component receives a shadow HTTP request and searches the shadow HTTP request for parameters. The parameters may be either substitution parameters or function parameters that indicate a function should be invoked. When a substitution parameter is encountered, the component replaces the parameter with its corresponding value from the parameters table. If a function parameter is encountered, the component invokes that function passing the shadow HTTP request. The function performs the appropriate processing on the shadow HTTP request. In step 1401, the component selects the next line of the shadow HTTP request starting with the first line. In step 1402, if all the lines of the shadow HTTP request have already been selected, then the component is done, else the component continues at step 1403. In step 1403, if the selected line contains a substitution parameter, then the component continues at step 1403a, else the component continues at step 1404. In step 1403a, the component replaces the substitution parameter with a parameter from the parameter table and loops to step 1403. In step 1404, if the selected line contains a function parameter, then the component continues at step 1404a, else the component loops to step 1401 to select the next line of the shadow HTTP request. In step 1404a, the component invokes the function designated by the function parameter passing the shadow HTTP request. The component then loops to step 1403. By looping to step 1403 after performing a parameter substitution or function invocation, the component recursively applies a parameter processing to the selected line. Alternatively, the component could loop to the first line in the HTTP request to start the processing over.

Although the present invention has been described in terms of various embodiments, it is not intended that the invention be limited to these embodiments. Modification within the spirit of the invention will be apparent to those skilled in the art. The scope of the present invention is defined by the claims that follow.

We claim:

1. A method for invoking a function of an object of an object class, the object being provided by a server computer system to be invoked by a client computer system, the function having a behavior, the method comprising:

sending a request from a client program to a server program, the request comprising a Universal Resource Locator ("URL") that identifies an object class and identifies a function of the object class to invoke;

receiving the request at the server program; and in response to receiving the request,
       instantiating an object of the object class identified in the URL of the received request;
       invoking the function identified in the URL of the received request; and
       under control of the invoked function,
           performing the behavior of the function;
           creating a response to be sent to the client program, the response containing state information describing a state of the object after the behavior of the function is performed; and
           sending the response to the client program whereby when the client program subsequently sends a request to invoke a function of the object class, the state information is included in the request so that the function can perform its behavior based on the state information.

2. The method of claim 1 wherein the URL identifies a shim program for instantiating the object of the object class and for invoking the function of the object.

3. The method of claim 2 wherein the shim program is stored in a dynamic linked library that is identified by the URL.

4. The method of claim 3 wherein the server program and the shim program support an Internet Server Application Programming Interface ("ISAPI") protocol.

5. The method of claim 2 wherein the shim program maintains a reference to the object so that upon receiving a subsequent request from a client program to invoke a function of an object of the object class, the referenced instance of the object can be used without instantiating a new object of the object class.

6. The method of claim 5 wherein the shim program passes to the invoked function the state information from the received subsequent request.

7. The method of claim 5 wherein the shim program maintains a table of references to objects of various object classes that it has instantiated.

8. The method of claim 5 wherein the shim program destroys referenced objects based on a predefined criteria.

9. The method of claim 8 wherein the predefined criteria is length of time since a request has been received to invoke a function of an object of that object class.

10. The method of claim 1 wherein the object class is indicated by an program identifier of an object server and the object class is retrieved from a registry of mappings from program identifiers to object classes.

11. The method of claim 1 wherein a reference to the object is maintained after the response is sent so that upon receiving a subsequent request from a client program to invoke a function of an object of the object class, the referenced object can be used without instantiating a new object of the object class.

12. The method of claim 11 wherein when a subsequent request is received to invoke a function of an object of the object class, invoking the function of the referenced object passing the state information.

13. The method of claim 1 wherein after the receiving of the request at the server program and before the response to the receiving is performed, the request is modified based on a pre-defined template.

14. The method of claim 13 wherein the template has command lines each specifying a command to perform on the request, and wherein the modifying of the request includes:

performing the command of each command line of the template on the request to generate a shadow request; and for each line in the shadow request,
       determining whether the line contains a parameter; and
       when the line contains a parameter, performing a behavior associated with the parameter.

15. The method of claim 1 wherein after the creating of the response to be sent to the client program and before the sending of the response, the response is modified based on a pre-defined template.

16. The method of claim 15 wherein the template has command lines each specifying a command to perform on the response, and wherein the modifying of the response includes:

performing the command of each command line of the template on the response to generate a shadow response; and for each line in the shadow response,
       determining whether the line contains a parameter; and
       when the line contains a parameter, performing a behavior associated with the parameter.

17. A computer system for allowing client programs to invoke functions of objects of objects classes, comprising:
- a server program that receives requests from client programs, the requests identifying a script to execute, the server program for loading the script into memory, invoking a function of the script, and providing a callback for invocation by the script to retrieve environment variables describing the received requests;
- a shim script having a function for being invoked by the server program, the function for invoking the callback to retrieve environment variables describing the request, for identifying from the environment variables the object class, for instantiating an object of the object class, and for invoking a function of the object class passing information describing the received request; and
- a function of the object class for receiving the passed information describing the received request, for performing a behavior of the function based on the passed information, and for sending to the client program that sent the received request a response having state information describing the state of the object after performing the behavior so that when the client program sends a subsequent request, containing the state information to the server program to invoke a function of an object of the object class the shim script can provide the state information to the object so that the function can perform behavior based on the state information.

18. The computer system of claim 17 wherein the shim script maintains a reference to the object after a response is sent so that upon receiving a subsequent request from a client program to invoke a function of an object of the object class, the referenced object can be used without instantiating a new object of the object class.

19. The computer system of claim 18 wherein when a subsequent request is received to invoke a function of an object of the object class, the function of the referenced object is invoked passing the state information.

20. The computer system of claim 18 wherein the shim script destroys referenced object based on predefined criteria.

21. The computer system of claim 20 wherein the predefined criteria is length of time since a request has been received to invoke a function of an object of that object class.

22. The computer system of claim 17 wherein the request is in the Hypertext Transfer Protocol ("HTTP").

23. The computer system of claim 22 wherein the request includes a Universal Resource Locator ("URL") that identifies the object class and the shim script.

24. The computer system of claim 17 wherein the server and the shim script support an Internet Server Application Programming Interface ("ISAPI").

25. A method for invoking a function of an object of an object class, the object being provided by a server computer system to be invoked by a client computer system, the function having a behavior, the method comprising:
- receiving a request sent from a client program to a server program, the request identifying a shim script, an object class, and a function of the object class;
- in response to receiving the request, loading and transferring control to the identified shim script; and
- under control of the shim script, when an object of the identified object class does not exists, instantiating an object of the identified object class;
  - invoking the identified function of the instantiated object; and
- under control of the invoked function,
  - performing the behavior of the function;
  - creating a response to be sent to the client program, the response containing state information describing a state of the object after the behavior of the function is performed; and
  - sending the response to the client program
- whereby a client program can effect the invocation of functions of a plurality of object classes and can send subsequent requests containing the state information so that the functions can perform behaviors based on the state information.

26. The method of claim 25 wherein the shim script is stored in a dynamic link library.

27. The method of claim 26 wherein the server program and the shim script supports an Internet Server Application Programming Interface ("ISAPI") protocol.

28. The method of claim 25 wherein the shim script maintains a reference to the object so that upon receiving a subsequent request from a client program to invoke a function of an object of the identified object class, the referenced instance of the object can be used without instantiating a new object of the identified object class.

29. The method of claim 28 wherein the shim script passes to the invoked function the state information from the received subsequent request.

30. The method of claim 28 wherein the shim script maintains a table of references to objects of various object classes that it has instantiated.

31. The method of claim 28 wherein the shim script destroys referenced objects based on a predefined criteria.

32. The method of claim 31 wherein the predefined criteria is length of time since a request has been received to invoke a function of an object of that object class.

33. The method of claim 25 wherein after the receiving of the request sent from the client program and before the response to the receiving is performed, the request is modified based on a template having command lines each specifying a command to perform on the request, the modifying including:
- performing the command of each command line of the template on the request to generate a shadow request; and
- for each line in the shadow request,
  - determining whether the line contains a parameter; and
  - when the line contains a parameter, performing a behavior associated with the parameter.

34. The method of claim 33 wherein the parameter is a substitute parameter and the behavior associated with the parameter is replacing the parameter with a value.

35. The method of claim 33 wherein the parameter is a fiuction parameter and the behavior associated with the parameter is invoking of a function associated with the parameter to modify the shadow request.

36. The method of claim 33 wherein the commands include a command to add a field to the request when the request does not already have a field with a certain name, a command to delete a field from the request, or a command to replace a field of the request when a value of the field does not match a certain criteria.

37. The method of claim 25 wherein after the creating of the response to be sent to the client program and before the sending of the response, the response is modified based on a template having command lines each specifying a command to perform on the request, the modifying including:
- performing the command of each command line of the template on the response to generate a shadow response; and for each line in the shadow response,
  determining whether the line contains a parameter; and
  when the line contains a parameter, performing a behavior associated with the parameter.

38. The method of claim 37 wherein the parameter is a substitute parameter and the behavior associated with the parameter is replacing the parameter with a value.

39. The method of claim 37 wherein the parameter is a function parameter and the behavior associated with the parameter is invoking of a function associated with the parameter to modify the shadow response.

40. The method of claim 37 wherein the commands include a command to add a field to the response when the response does not already have a field with a certain name, a command to delete a field from the response, or a command to replace a field of the response when a value of the field does not match a certain criteria.

41. A computer-readable medium containing instructions for causing a computer system to invoke a function of an object of an object class, the object being provided by a server computer system to be invoked by a client computer system, the function having a behavior, by:
  receiving a request sent from a client program to a server, program the request identifying a script, an object class, and a function of the object class;
  in response to receiving the request, loading and transferring control to the identified script; and
  under control of the script,
    when an object of the identified object class does not exists, instantiating an object of the identified object class;
    invoking the identified function of the instantiated object; and
    under control of the invoked function,
      performing the behavior of the function;
      creating a response to be sent to the client program, the response containing state information describing a state of the object after the behavior of the function is performed; and
      sending the response to the client program for use in initializing objects of the identified object class when subsequent invocations of functions are requested by the client program, the subsequent invocations to include the state information so that the functions can perform behaviors based on the state information.

42. The computer-readable medium of claim 41 wherein the script is stored in a dynamic link library.

43. The computer-readable medium of claim 42 wherein the server and the script supports an Internet Server Application Programming Interface ("ISAPI") protocol.

44. The computer-readable medium of claim 41 wherein the script maintains a reference to the object so that upon receiving a subsequent request from a client to invoke a function of an object of the identified object class, the referenced instance of the object can be used without instantiating a new object of the identified object class.

45. The computer-readable medium of claim 44 wherein the script passes to the invoked function the state information from the received subsequent request.

46. The computer-readable medium of claim 44 wherein the script maintains a table of references to objects of various object classes that it has instantiated.

47. The computer-readable medium of claim 44 wherein the script destroys referenced objects based on a predefined criteria.

48. The computer-readable medium of claim 47 wherein the predefined criteria is length of time since a request has been received to invoke a function of an object of that object class.

* * * * *

UNITED STATES PATENT AND TRADEMARK OFFICE
CERTIFICATE OF CORRECTION

PATENT NO.     : 5,991,802

DATED          : November 23, 1999

INVENTOR(S)    : Allard et al.

It is certified that error appears in the above-identified patent and that said Letters Patent is hereby corrected as shown below:

| Col./Line | Error Reads | Should Read |
|---|---|---|
| 2/20  | scriptIname | script_name |
| 8/13  | HTTF | HTTP |
| 10/24 | an program | a program |
| 11/26 | object class the shim | object class, the shim |
| 11/64 | exists | exist |
| 12/51 | fluction | function |
| 13/24 | server, program the request | server, the request |
| 13/31 | exists | exist |

Signed and Sealed this

Seventeenth Day of April, 2001

Attest:

NICHOLAS P. GODICI

*Attesting Officer*     *Acting Director of the United States Patent and Trademark Office*